United States Patent Office 3,666,390
Patented May 30, 1972

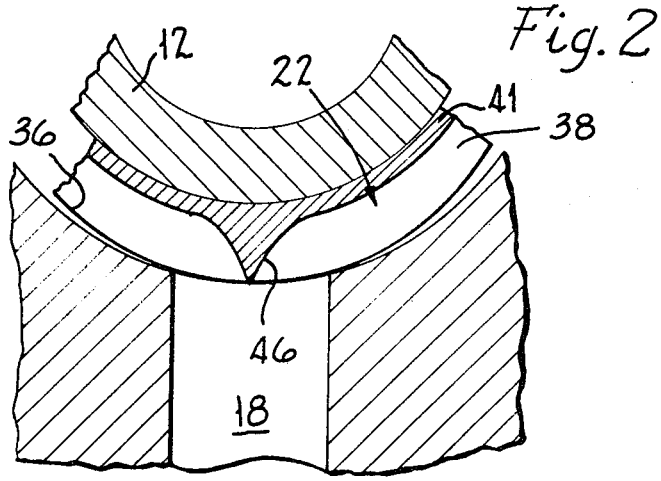
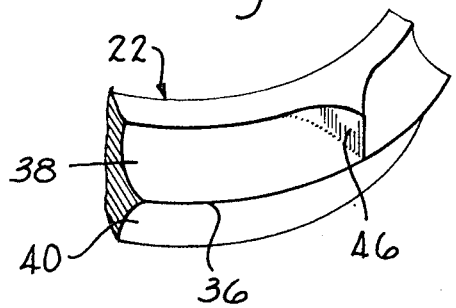
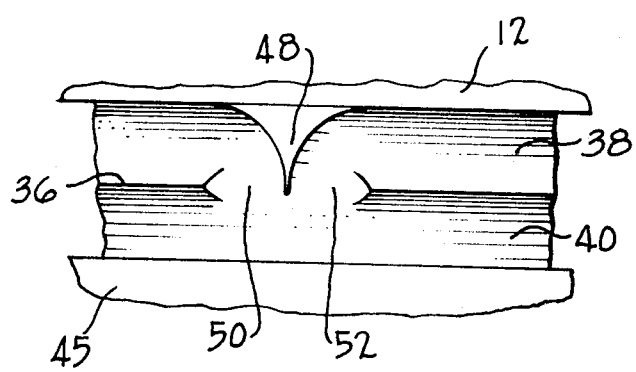
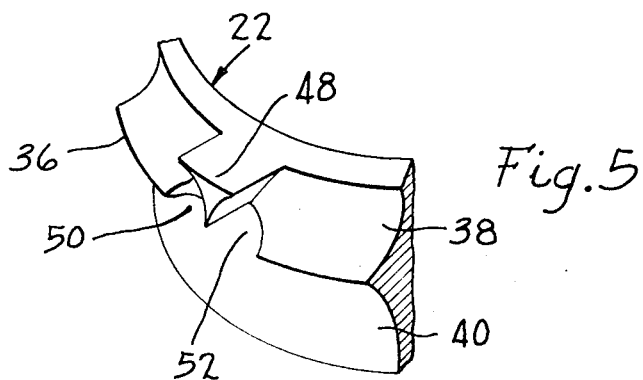

3,666,390
EXTRUSION DIE
Milo Gerow, 108 Ohio Ave., Beach Haven, N.J. 08008
Filed Sept. 2, 1969, Ser. No. 854,646
Int. Cl. B29d 23/04
U.S. Cl. 425—380
10 Claims

ABSTRACT OF THE DISCLOSURE

A tubular extrusion die includes a pressure chamber and regulating passage in the flow passage between the entrance port of the die and the annular die lips where the extrusion material is shaped as it leaves the die. The pressure chamber includes a plurality of annular pressure channels in which the upper communicates with the lower, and which is arranged to control the annular distribution of flow (pressure, velocity and volume) of extrusion material to the die lips. The cross-sectional area of the regulating passage of the pressure chamber is less than or equal to that of the entrance port.

BACKGROUND OF THE INVENTION

This invention relates to a static extrusion die for the extrusion of polymers into tubular plastics.

Some tubular extrusion dies presently available are constructed with internal obstructions in the plastic flow path (due, for example, to connecting structures between inner and outer die portions). These obstructions tend to unbalance the flow or gauge control, resulting in undesirable weld or fused lines in the finished film and sheeting. The obstructions also cause portions of the material to be slow-moving or to be hung up, and these portions age and decompose because they remain in the heated die for too long a period. As the aged or decomposed portions bleed out and mix with the normal material, they cause the extruded plastic to have badly discolored areas or streaks and also cause undesirable variations in strength and gauge of the plastic, all of which make the products less valuable and sometimes useless. With some materials that are difficult to extrude, the die may become so contaminated with aged or decomposed material that the entire production lines must be shut down so that the die can be completely disassembled and cleaned, resulting in loss of production.

Commercially available dies which do not have obstructions must often be operated at low pressures and low volume in order to obtain a fair gauge control. Some of such dies that are side fed from the extruder generally have a bleeder valve on the opposite side of the die from the extruder to continuously bleed material so as to eliminate a low velocity zone and reduce the accumulation of aged or decomposed material, whereby longer periods of operation may be achieved.

A tube extrusion die having a pressure channel, originated by applicant some years ago, has been successfully operated at high pressures and tends to provide uniform gauge control with greater control of flow, pressure, velocity, and pressure drop of the material being extruded. For purposes of providing good gauge control (e.g. about 5%), a 45° pressure channel was found to be an important construction feature. This inclined channel tends to be more expensive to machine accurately and may require larger die dimensions. Accordingly, it has been found desirable to provide a die construction with good gauge control and preferably using a horizontal pressure channel, though with the ability to employ the features of the inclined channel where desirable.

It is also desirable that the die construction be suitable for use in various plastic forming techniques and associated apparatus, including the mandrel forming apparatus described in applicant's patent U.S. 2,720,680, and the blown tubing technique and apparatus described in applicant's patent, U.S. 3,144,494, For example, in the mandrel apparatus, the die should have inlet and outlet services for air and water.

SUMMARY OF THE INVENTION

It is among the objects of this invention to provide a new and improved extrusion die.

Another object is to provide a new and improved extrusion die providing good gauge control of the extruded plastic material.

Another object is to provide a new and improved extrusion die of relatively small dimensions, which permits accurate machining of components at low cost, permits easy cleaning, and reduces down time on the production line.

In accordance with one embodiment of the invention, a static 90° extrusion die is provided with a control section that includes a horizontal pressure chamber formed of a plurality of annular pressure channels one above the other, and with the upper one communicating with the lower one for passage of material. The pressure channels receive extrusion material through an entrance port from a suitable extruder. Material passes from the entrance port to the pressure chamber, and exits through a regulating passage of the control section, and ultimately to the die lips from which the material is extruded. The pressure chamber and its regulating exit passage are so dimensioned that the volume of material that can be passed thereby is no greater than that supplied to it under pressure at the entrance port. The pressure channel supplies a flow of material which is substantially balanced as to pressure and velocity so that it serves as a regulated, substantially uniform source of material under pressure for extrusion by the die lips with a substantial uniformity of gauge or thickness of the shaped material.

BRIEF DESCRIPTION OF THE DRAWING

The foregoing and other objects of this invention, the various features thereof, as well as the invention itself, may be more fully understood from the following description when read together with the accompanying drawing, in which:

FIG. 2 is a fragmentary sectional view of a modification of the pressure chamber of FIG. 1;

FIG. 3 is a fragmentary perspective view of the channel ring of FIG. 2;

FIG. 4 is a fragmentary elevational view of a modified channel ring for use in the extruder of FIG. 1; and FIG. 5 is a fragmentary perspective view of the channel ring of FIG. 4.

DESCRIPTION OF PREFERRED EMBODIMENTS

Figure 1:
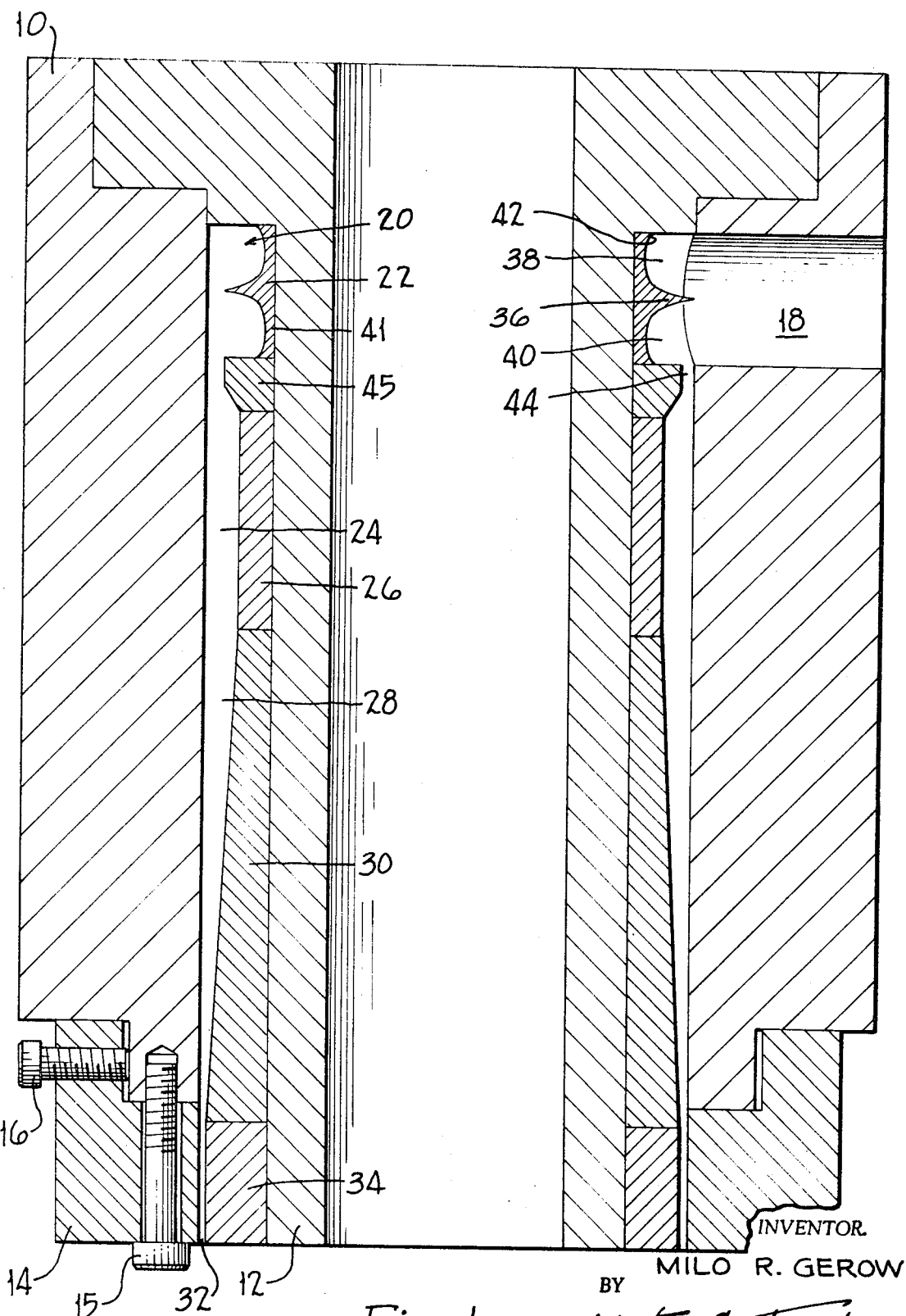
FIG. 1 is a sectional view of an extrusion die embodying this invention.

Throughout the drawing, corresponding parts are referenced by similar numerals.

The circular die of FIG. 1 includes a die body 10 having a uniform cylindrical center bore, and an axially mounted core pin 12 within the body and attached thereto by conventional means not shown. The outer cylindrical surface of core pin 12 is generally coaxial with the bore of the die body 10, except for eccentricities and tapers (as described below) that are introduced by rings attached to and made a part of core pin 12. The die body includes a separate, adjustable die ring 14 that surrounds the lower end of the core pin and is generally concentric thereto, and that is secured by bolts 15 to the main die body and adjustably positioned thereon by screws 16 that pass through the ring 14 and bear against the die body, in a fashion well known to the art. Thermoplastic materials such as various polymers (e.g. polyethylene or vinyl) are supplied to an entrance port 18 from a suitable extruder such as the screw extruder shown in the aforementioned patents. The passage of the entrance port 18 has a certain cross-sectional area interrelated to the areas of other passages, as hereinafter described, and that port communicates directly with a control and regulating section that includes an annular pressure chamber 20 which is generally horizonal and extends around the core pin. (The horizontal and vertical orientations referred to herein relate to the upright operating position of the die shown with the core pin axis vertical as shown in the drawing; the die may also be operated in other positions including that of the core pin axis horizontal.)

The pressure chamber is formed into passages by a pressure channel ring 22. The ring may be integrally formed on the core pin, or separately formed and removably attached thereto; the latter construction is preferred from the standpoint of cost of construction and to permit interchangeable replacement of different shapes and sizes of pressure channels. Similarly, as explained below, other portions (26, 30, 34, 45) of the core pin that form the flow passage may be constructed as removable rings, alhough they may also be integrally formed.

The pressure chamber 20, in turn, communicates with another portion of the control section, namely, a control passage 24 formed between the die body 10 and two control rings 26 and 45, the latter ring 45 being interposed between ring 26 and the channel ring 22. The ring 26 is generally of uniform thickness so that the passage 24 surrounding it is likewise of uniform width around the ring. The ring 45 at its largest outer diameter portion, at the exit of channel 40, forms an exit passage 44; axially, the diameter of this ring tapers down to that of the ring 26. The width of the ring 45 at its largest diameter portion is nonuniform around the ring, for reasons indicated below, so that the annular passage 44 is of varying thickness, and its inner surface is eccentric around the ring 45. The control passage 24, in turn, communicates with an annular tapered passage 28 formed between the die body and a tapered transition ring 30. The transition passage 28 at its upper end is dimensioned to be about the same as the lower end of the control passage 24, and at its lower end, about the same as the die-land passage 32 formed between the die ring 14 and the die-land ring 34 surrounding the lower end of the core pin. Die ring 14 and the die-land ring 34 may be stationary, as shown, or each may be rotated or counterrotated during the extrusion in a manner well known in the art.

As shown in FIG. 1 (see also FIGS. 3 and 5), the pressure-channel ring has a central partition section 36 which is generally annular and forms two annular channels 38 and 40, one above the other and generally at the same radial distance from the core pin axis. The pressure channel ring 22 may take various forms and provide different clearances for passage of various materials under different viscosity, pressure, and flow conditions, from the upper channel 38 to the lower channel 40. The inner web 41 of the ring 22 may be a relatively thin one, and its inner surface attached to the core pin 12. It has generally rounded outer surfaces 42 that ensure smooth passageways for the flow of the extruded material thereby avoiding dead space for slow-moving extrusion material that would tend to age and accumulate. The cross-sectional shapes and areas of the two channels may be different.

The outer rim of partition 36 is generally horizontal and preferably dimensioned to be eccentric, with its radius adjacent the entrance port 18 being substantially the same as the inner radius of the die body and having a substantial clearance at the diametriclly opposite end for greater overflow of material from the upper channel 38 to the lower 40. Thereby, pressure drops through the channels 38 and 40 to the end diametrically remote from the entrance port 18 are at least partly compensated. Alternatively, the flow from the upper channel 38 to the lower channel 40 may be via holes (not shown) through the partition 36 instead of spilling over its edge, which may be closed; compensation and variation of flow may be controlled by the number and sizes of the holes. In any case, flow from the upper to the lower channel is generally parallel to the axis of the core pin.

The cross-sectional area of the annular exit passage 44 from the lower pressure channel 40 determines the quantity of extruded material to be supplied to the die lips. Its overall cross-sectional area is chosen to be less than or equal to the cross-sectional area of the entrance port, so that it is effective for regulation and control of pressure and velocity of material supplied to the die lips. The passage 44 may be used, by varying its thickness around the annulus thereof, to compensate for variations in pressure drop around the passage. The latter variations may be due to the different distances from the latter variations may be due to the different distances from the entrance port of a side-fed die, as shown, or due to any other parameter and may occur in end-fed dies as well as in both coaxial and non-coaxial types. Effectively, the exit port 44 formed by regulating ring 45 provides a regulating control of the flowing material parallel to the core-pin axis so that it is substantially balanced as to pressure and velocity as it is supplied generally parallel to the core-pin axis via passages 24 and 28 to the die lips 32, whereby the latter may effectively perform the function of shaping the material and determining overall thickness or gauge. With a uniform supply of material around the annular passage to the die lips, the latter tends to extrude a tube having a substantially uniform thickness, with but a minor adjustment for small variations.

The passage 24 formed by the control ring 26 may serve by its dimensions to further regulate pressure and velocity of the extruded material being passed to the die lips. In the preferred embodiment shown in FIG. 1, this passage 24 has a generally uniform radical dimension along its length, due to the uniform thickness of the ring 26; as explained above, this passage may be eccentric at any particular axial position, with the radial dimension generally greater at annular positions more remote from the entrance port 18 to compensate for the pressure drop that generally increases with passage distance fro mthe port 18. Various alternative forms of such control rings may be provided (and with or without said eccentricity) to ensure greater control either at the upper end (e.g. by regulating ring 45) or at the lower end of the control passage 24 by a suitable regulating ring (not shown). In addition, regulating ring 45 and ring 26 may be combined as one ring of uniform thickness axially and varying thickness around the ring to produce an eccentricity of the outer ring surface.

The passage 28 provides a smooth transition in its dimensioning from that of the control passage 24 down to the thickness of the die lip passage 32. The ultimate dimensioning of the die lip passage 32 is determined by adjustment of the die ring 14, and this adjustment serves to provide whatever small measure of eccentricity is required in order to achieve the optimum uniformity of the gauge of the extruded plastic. Techniques for adjusting the die ring to obtain the desired thickness are well known in the art.

The entrance port is preferably constructed to avoid the head-on impact of material entering the pressure channel and running into the vertical wall of the channel ring. To avoid loss in pressure and velocity in the material as it overcomes this static resistance before it splits into both sides of the annular channel, the upper chamber can be assisted by the insertion of a splitter 46 (FIGS. 2 and 3) which changes the direction of the flow to curve smoothly around without substantial loss of velocity. Another approach for avoiding this effect is to taper the entrance port so that it widens from its input to its output and so that the latter extends a greater distance around the flow channels and thereby forms the material in a flow pattern suitable for movement around the pressure channels.

At the side of the pressure channel diametrically remote from the entrance port 18, the two opposed flow paths of the channel meet and tend to produce a pressure loss. The latter may be substantially eliminated by a separator 48 (FIGS. 4 and 5) located at the remote end of the upper channel 38, and by removal of the partition 36 on either side of that separator to form passages 50, 52 down into the lower channel. The arcuate shape of the separator directs the material coming in opposing directions into parallel downward paths without interference one with the other.

This invention has special application in use with the mandrel forming apparatus and method for extruded tubing, one form of which is described in applicant's patent U.S. 2,720,680, which is here incorporated by reference. In that type of apparatus, it is desirable to supply air and/or water internally of the tubing as it leaves the extrusion die and is passed over a mandrel for the final shaping of the extruded tubing. A side fed die is especially useful with such apparatus, in that the center of the core pin is accessible for passing air and/or water tubes axially therethrough (e.g. through the center bore thereof as viewed in FIG. 1) and internally of the extruded plastic tubing. With this invention, notwithstanding the side fed entrance port 18, the pressure chamber 20 and regulating passage 44 are effective to provide a continuous supply of extrudant to the die lips, and the extrudant is maintained substantially uniform as to pressure and velocity around the annular passages 24 and 28 to the die lips. Thereby, the die lips, with or without a minor adjustment in their positioning, are able to achieve substantially uniform thickness of the material that they pass. By means of variations in the flow passages around the die, including the aforementioned eccentricities, non-uniformities due to the side-fed entrance port are substantially compensated.

This invention is also applicable to the extrusion of multi-ply polymer films in which a plurality of concentric extrusion passages are provided, one for each ply, and the passages are arranged to terminate in a common extrusion orifice where a tubular laminate of the various films is extruded. See, for example, U.S. Pat. No. 3,419,938 for one form of construction of such a multi-film die. This invention may be employed in each one of the concentric passages of the die of that patent by providing the multichannel pressure chamber and regulating passage as described above.

Two polyethylene resins were used in the extrusion of this invention; one was a resin of melt index 1.0 and a density of 0.926, and the other had a melt index of 1.5 and a density of 0.936. The initial resins were produced on a 1½ inch Black and Clawsen extruder utilizing a high compression screw. Subsequently a 3½ inch Egan extruder was used to obtain a higher put-through rate. In addition, vinyl tubing was extruded.

It was found that with the channels 38 and 40 of the pressure chamber oriented along planes at right angles to the axis of the core pin, and the extrusion passage 44 generally parallel to the core pin axis, the flow from the lower channel 40 tended to be perpendicular to its edge and therefore in a direction to provide uniform supply of extrudant to the die lips. The axial length (e.g. ¼ inch) of the die passage 44 was sufficient to ensure regulating action, and its eccentricity provided a basis for compensation for variations in pressure and/or velocity. As the lower channel 30 supplies the extrudant through passageway 44, the extrudant from the upper channel spills over the rim of partition 36 in a controlled fashion to maintain a balanced supply in the lower channel. With the eccentricity of the passage around the partition 36, the overall pressure chamber 20 tends to be self-balancing as to pressure and velocity and to provide a source of extrudant that is substantially uniform as it flows generally parallel to the core pin axis.

Die films were extruded through a 4-inch tubular die of the type described with a thickness of about 0.020 inch. The uniformity of the die around the plastic tubing at any axial position thereof was held very close to uniform (e.g. generally better than ±5%) and substantially better than many commercial dies of comparable size. The highest level of uniformity was achieved with a double channel pressure chamber of the type generally illustrated in FIG. 2, in which the partition 36 had a clearance of 0.60 inch at the point diametrically remote from the entrance port 18, and a lesser amount of clearance around the partition, down to zero clearance at the center of the entrance port. The invention was also successfully operated with no eccentricity and with other variations in clearance around the partition. The passage 44 around the regulating ring portion 45 was found to produce good results with ¼-inch in axial length and with a radial width of 0.020 inch adjacent the entrance port and 0.060 inch at the point diametrically remote from the entrance port. Other dimensions of the regulating passage were also employed in the succeessful operation of this invention.

Accordignly, a new and improved extrusion die is provided for producing extruded tubular plastics with substantially uniform thickness. The die can be made with relatively small dimensions, it permits accurate machining of components at low cost, permits easy cleaning, and reduces down time on the production line.

What is claimed is:

1. A tubular extrusion die comprising:
a die body and a core pin mounted within said body and forming a substantially annular flow passage therebetween generally parallel to the axis of said core pin; entrance port means including a passage for transmitting extrusion material under pressure to said flow passage; said annular flow passage including:
an annular die land section for passing the extrusion material out of said die and for shaping the passed material and determining the thickness thereof;
and a control and regulating section for receiving extrusion material under pressure from said entrance port means and for establishing a continuous supply thereof which is substantially uniform around said annular passage as to pressure and velocity for delivery to said die land section,
said control and regulating section including an annular pressure chamber substantially at right angles to the axis of said core pin and located as part of the flow path between said entrance passage and said die land section for regulating the annular distribution of pressure and velocity of material supplied to the die land section,
said pressure chamber including a plurality of substantially parallel annular pressure channels transverse to the core pin axis and with one pressure channel communicating with another of said channels via a flow channel, and said other channel being located to receive extrusion material directly from said entrance port means and to supply said material via another flow channel to said die land section,
whereby said control and regulating section is effective to regulate the supply of extrusion material to said die land section to achieve substantially uniform thickness of the shaped material.

2. An extrusion die as recited in claim 1 wherein said one channel is located to receive extrusion material directly from said entrance port means and to supply said material via a flow channel to said other channel.

3. An extrusion die as recited in claim 2 wherein said cylindrical wall of said die body and a ridged shaped wall of said core pin.

4. An extrusion die as recited in claim 2 wherein the flow passage between the parallel pressure channels is generally annular and of varying thickness therearound.

5. An extrusion die as recited in claim 2 wherein said control and regulating section of the annular flow passage has an annular regulating passage of substantial length and of a cross-sectional flow area less than or equal to that of the entrance passage and located at the exit of said pressure chamber.

6. An extrusion die as recited in claim 5 wherein the annular regulating passage varies in cross-sectional thickness around the annulus thereof.

7. An extrusion die as recited in claim 1 wherein said control and regulating section of said annular flow passage varies in cross-sectional area around the annulus thereof.

8. An extrusion die as recited in claim 7 wherein the entrance port passage is transverse to the axis of the core pin to form a side fed die.

9. An extrusion die as recited in claim 1 wherein said control and regulating section has an annular regulating passage of substantial length and of a cross-sectional flow area less than or equal to that of the entrance passage.

10. A tubular extrusion die comprising:
a die body and a core pin mounted within said body and forming a substantially annular flow passage therebetween generally parallel to the axis of said core pin;
entrance port means including a passage for transmitting extrusion material under pressure to said flow passage;
said annular flow passage including:
an annular die land section for passing the extrusion material out of said die and for shaping the passed material and determining the thickness thereof;
and a control and regulating section for receiving extrusion material under pressure from said entrance port means and for establishing a continuous supply thereof which is substantially uniform around said annular passage as to pressure and velocity for delivery to said die land section,
said control and regulating section including an annular pressure chamber substantially at right angles to the axis of said core pin and located as part of the flow path between said entrance passage and said die land section for regulating the annular distribution of pressure and velocity of material supplied to the die land section,
said pressure chamber including a plurality of substantially parallel annular pressure channels transverse to the core pin axis and with one pressure channel communicating with another of said channels via a flow channel, at least a substantial portion of each pressure channel being located at the same radical distance from said core pin axis, and said other channel being located to receive extrusion material directly from said entrance port means and said one channel being located to supply said material via another flow channel to said die land section,
whereby said control and regulating section is effective to regulate the supply of extrusion material to said die land section to achieve substantially uniform thickness of the shaped material.

References Cited

UNITED STATES PATENTS

| | | | |
|---|---|---|---|
| 2,978,748 | 4/1961 | McCauley et al. | 18—14 S |
| 3,026,565 | 3/1962 | Bonner | 18—14 G |
| 3,111,713 | 11/1963 | Kaplan | 18—14 G |
| 3,355,769 | 12/1967 | Fogelberg | 18—14 G |

J. SPENCER OVERHOLSER, Primary Examiner

N. E. LEHRER, Assistant Examiner

PO-1050
(5/69)

UNITED STATES PATENT OFFICE
CERTIFICATE OF CORRECTION

Patent No.  3,666,390            Dated      May 30, 1972

Inventor(s)  Milo R. Gerow

It is certified that error appears in the above-identified patent and that said Letters Patent are hereby corrected as shown below:

Col. 4, lines 26-27, delete "latter variations may be due to the different distances from the".

Col. 6, line 30, "Accordignly" should be --Accordingly--.

Col. 7, line 1, after "said" insert --pressure channels are formed between a substantially--

Signed and sealed this 29th day of August 1972.

(SEAL)
Attest:

EDWARD M. FLETCHER, JR.
Attesting Officer

ROBERT GOTTSCHALK
Commissioner of Patents